United States Patent
Zhao et al.

(10) Patent No.: US 9,665,222 B2
(45) Date of Patent: May 30, 2017

(54) IN-CELL TOUCH PANEL AND DISPLAY DEVICE WITH SELF-CAPACITANCE ELECTRODES

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weijie Zhao, Beijing (CN); Xue Dong, Beijing (CN); Haisheng Wang, Beijing (CN); Shengji Yang, Beijing (CN); Yingming Liu, Beijing (CN); Xiaoliang Ding, Beijing (CN); Hongjuan Liu, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 5 days.

(21) Appl. No.: 14/554,124

(22) Filed: Nov. 26, 2014

(65) Prior Publication Data

US 2016/0026291 A1    Jan. 28, 2016

(30) Foreign Application Priority Data

Jul. 24, 2014  (CN) .......................... 2014 1 0357093

(51) Int. Cl.
G06F 3/045 (2006.01)
G06F 3/044 (2006.01)
G06F 3/041 (2006.01)

(52) U.S. Cl.
CPC ............ *G06F 3/044* (2013.01); *G06F 3/0412* (2013.01); *G06F 2203/04103* (2013.01)

(58) Field of Classification Search
CPC ...................................................... G06F 3/044
See application file for complete search history.

(56) References Cited

U.S. PATENT DOCUMENTS

2008/0239214 A1*  10/2008  Lee ..................... G02F 1/13338
                                                        349/106
2013/0044074 A1*   2/2013  Park ..................... G02F 1/13338
                                                        345/174

(Continued)

FOREIGN PATENT DOCUMENTS

CN       102841716 A       12/2012
CN       102937852 A        2/2013

(Continued)

OTHER PUBLICATIONS

First Chinese Office Action dated Aug. 18, 2016; Appln. No. 201410357093.3.
Second Chinese Office Action dated Nov. 14, 2016; Appln. No. 201410357093.3.
Third Chinese Office Action dated Feb. 4, 2017; Appln. No. 201410357093.3.

*Primary Examiner* — Kwang-Su Yang
(74) *Attorney, Agent, or Firm* — Ladas & Parry LLP

(57) ABSTRACT

An in-cell touch panel and a display device comprising the same are provided. in-cell touch panel, comprising: an array substrate, comprising data lines provided thereon; a plurality of self-capacitance electrodes, which are provided on a same layer and independent of each other on the array substrate, wherein the self-capacitance electrodes are insulated from the data lines; a touch detection chip; and a plurality of wires for connecting the self-capacitance electrodes to the touch detection chip, wherein the wires and the data lines are arranged on the same layer and insulated from each other and have a same wiring direction. The in-cell touch panel has reduced production costs and improved production efficiency.

13 Claims, 8 Drawing Sheets

(56) References Cited

U.S. PATENT DOCUMENTS

| | | |
|---|---|---|
| 2014/0055685 A1 | 2/2014 | Wang et al. |
| 2014/0111473 A1 | 4/2014 | Yang et al. |
| 2014/0125626 A1 | 5/2014 | Yang et al. |
| 2014/0362031 A1* | 12/2014 | Mo .................. G09G 3/36 345/174 |
| 2015/0085208 A1* | 3/2015 | Lee .................. G06F 3/044 349/12 |
| 2015/0268774 A1 | 9/2015 | Xu |
| 2015/0372028 A1* | 12/2015 | Lee .............. G06F 3/0412 438/50 |
| 2016/0132166 A1* | 5/2016 | Kim .............. G06F 3/0412 345/173 |
| 2016/0188071 A1 | 6/2016 | Xu et al. |
| 2016/0274716 A1 | 9/2016 | Liu et al. |

FOREIGN PATENT DOCUMENTS

| | | |
|---|---|---|
| CN | 102955637 A | 3/2013 |
| CN | 103149748 A | 6/2013 |
| CN | 103257769 A | 8/2013 |
| CN | 103279245 A | 9/2013 |
| CN | 103728761 A | 4/2014 |
| CN | 103793120 A | 5/2014 |
| CN | 103885660 A | 6/2014 |
| CN | 104020893 A | 9/2014 |
| JP | 2013-206444 A | 10/2013 |

\* cited by examiner

IN-CELL TOUCH PANEL AND DISPLAY DEVICE WITH SELF-CAPACITANCE ELECTRODES

TECHNICAL FIELD

Embodiments of the present disclosure relate to an in-cell touch panel and a display device comprising the same.

BACKGROUND

With the rapid development of display technologies, touch screen panels have been gradually widely applied in people's live. Currently, the touch screen panels, according to configuration, can be divided into the types of add-on touch panels, on-cell touch panels and in-cell touch panels. An add-on touch panel is obtained by separately producing a touch screen and a liquid crystal display (LCD) and then attaching the touch screen and the LCD together to form an LCD with touch function. Such an add-on touch panel has the defects of high production cost, low light transmittance, great module thickness and so on. An in-cell touch panel is obtained by embedding touch electrodes of a touch screen within an LCD, which not only can reduce the overall thickness of a module but also can greatly reduce the production costs of the touch screen, and is favored by major panel manufacturers.

Currently, an in-cell touch panel utilizes the principle of mutual capacitance or self-capacitance to achieve the function of detecting a finger touch position. In the self-capacitance principle, self-capacitance electrodes disposed on the same layer and insulated from each other may be arranged in the touch panel. When a human body does not touch the screen of the panel, the capacitance produced by the self-capacitance electrodes is at a fixed value. When a human body touches the screen of the panel, the capacitance produced by corresponding self-capacitance electrodes is the sum of the fixed value and the capacitance due to the human body. The touch detection chip can determine the touch position by detecting the capacitance value variation of the self-capacitance electrodes during a touch period (interval). As the capacitance of the human body can be imposed on the capacitance of all the self-capacitance electrodes, compared with the case that the capacitance of the human body can only be imposed on the projected capacitance of mutual capacitance electrodes, the capacitance variation amount caused by the touch of the human body on the touch panel will be larger than that of the touch panel manufactured in the principle of mutual capacitance. Therefore, compared with a mutual-capacitance touch panel, a self-capacitance touch panel can effectively improve the signal-to-noise (S/N) ratio of touch and hence improve the accuracy of touch sensing.

SUMMARY

Embodiments of the present disclosure provide an in-cell touch panel and a display device, which can reduce the production costs of the in-cell touch panel and improving the production efficiency.

An embodiment provides an in-cell touch panel, comprising: an array substrate; data lines arranged on the array substrate; a plurality of self-capacitance electrodes, which are provided on a same layer and independent of each other on the array substrate, wherein the self-capacitance electrodes are insulated from the data lines; a touch detection chip; and a plurality of wires for connecting the self-capacitance electrodes to the touch detection chip, wherein the wires and the data lines are arranged on the same layer and insulated from each other and have a same wiring direction.

For example, in an embodiment, the array substrate is provided with a plurality of alternately arranged sub-pixel columns with color filters of different colors; an area occupied by sub-pixel columns of color filters of one color is smaller than areas occupied by sub-pixel columns of color filters of other colors; and the wires are arranged within gaps adjacent to the sub-pixel columns of color filters of one color occupying the small area.

For example, in an embodiment, the array substrate is provided with alternately arranged red sub-pixel columns, green sub-pixel columns and blue sub-pixel columns; an area occupied by the blue sub-pixel columns is smaller than an area occupied by the red sub-pixel columns or the green sub-pixel columns; and the wires are arranged within gaps adjacent to the blue sub-pixel columns.

For example, in an embodiment, the array substrate comprises a plurality of sub-pixels arranged in an array; every two columns of sub-pixels adjacent to each other are taken as a sub-pixel group, and in the sub-pixel group two data lines are arranged between the two columns of sub-pixels and configured to provide data signals to the two columns of sub-pixels respectively; and the wires are arranged within gaps between adjacent sub-pixel groups.

For example, in an embodiment, the in-cell touch panel further comprising: a plurality of connection wires arranged on the same layer with the wires and insulated from the wires, wherein the connection wires are disposed in a same straight line as the wires and each are in parallel connection with an overlapped self-capacitance electrode.

For example, in an embodiment, an interlayer insulating layer is provided between the self-capacitance electrodes and the wires; the self-capacitance electrodes are electrically connected with corresponding wires by through holes of the interlayer insulating layer; and recessed portions are formed in overlapped areas, between the self-capacitance electrodes and wires except the wires electrically connected therewith, in the interlayer insulating layer.

For example, in an embodiment, the through holes and the recessed portions have a same cross-sectional shape and are uniformly distributed in the interlayer insulating layer.

For example, in an embodiment, the self-capacitance electrodes together form a common electrode layer on the array substrate; and the touch detection chip is also configured to apply a common electrode signals to the self-capacitance electrodes in a display period.

For example, in an embodiment, the array substrate comprises pixel electrodes, the self-capacitance electrodes and the pixel electrodes on the array substrate are disposed on the same layer; and the self-capacitance electrodes are each provided in a gap between two adjacent pixel electrodes.

Another embodiment provides a display device comprising any of the above-mentioned in-cell touch panels.

BRIEF DESCRIPTION OF THE DRAWINGS

Simple description will be given below to the accompanying drawings of the embodiments to provide a more clear understanding of the technical proposals of the embodiments of the present disclosure. It will be obvious to those skilled in the art that the drawings described below only involve some embodiments of the present disclosure but are not intended to limit the present disclosure.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. It will be obvious to those skilled in the art that the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

The thickness and the shape of film layers in the accompanying drawings do not reflect the true scale and are only intended to illustrate the content of the present disclosure.

The inventors have found during research that: in an in-cell touch panel, wires for connecting self-capacitance electrodes and a touch detection chip are generally arranged on different layers from the self-capacitance electrodes, so that two new film layers are added in the traditional display panel, and hence new processes must be added in the process for manufacturing the touch panel, and consequently the production costs are increased and the production efficiency cannot be improved.

Figure 1:
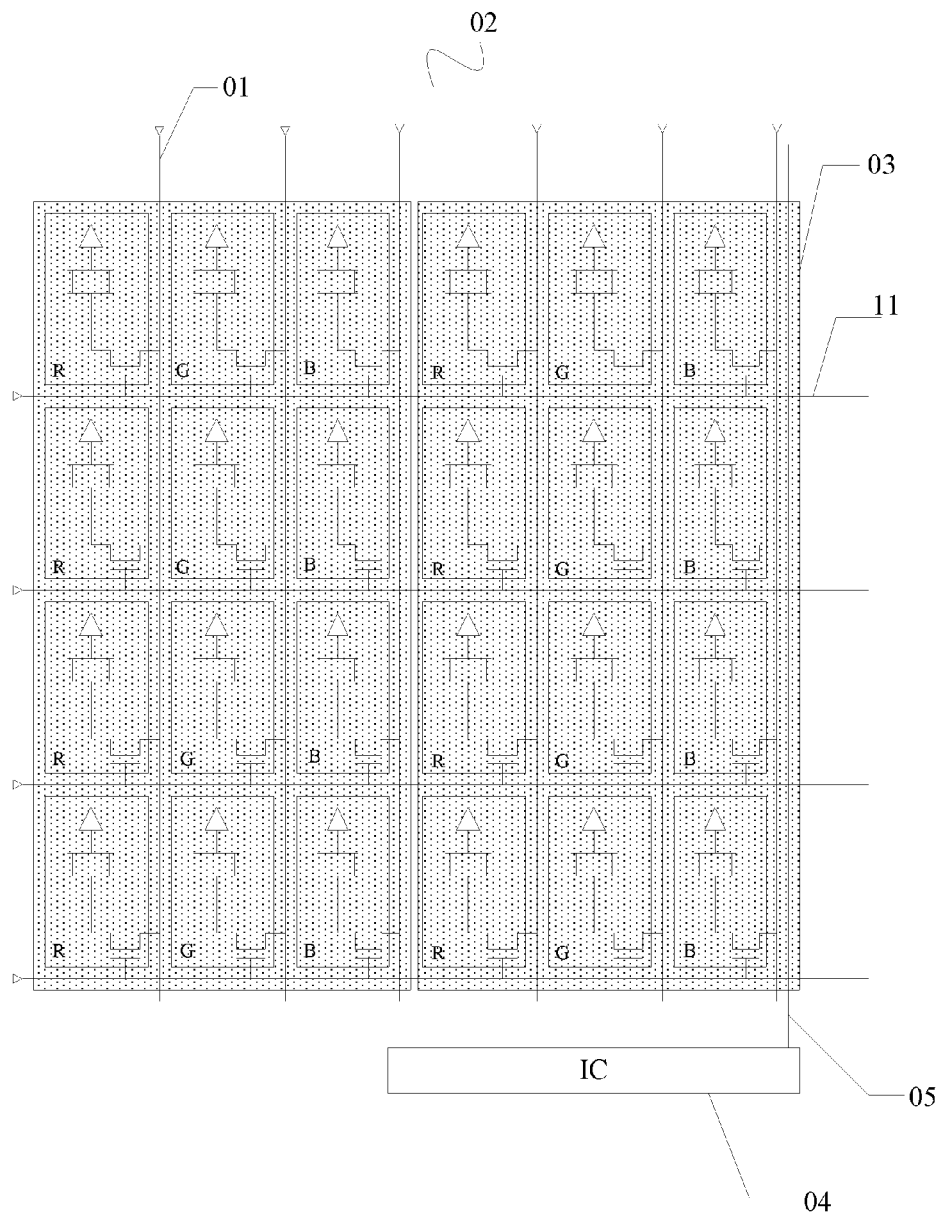
FIGS. 1 and 2 are respectively schematic structural top views of in-cell touch panels provided by the embodiment of the present disclosure.

At least one embodiment of the present disclosure provides an in-cell touch panel. As illustrated in FIG. 1, the in-cell touch panel comprises an array substrate 02 and a plurality of data lines 01, a plurality of gate lines 11, a plurality of self-capacitance electrodes 03, a touch detection chip 04 and a plurality of wires 05 that are arranged on the array substrate 02. The data lines 01 and the gate lines 11 intersect with each other to define sub-pixel regions, each of which may include a thin film transistor as a switching element and a pixel electrode.

The plurality of self-capacitance electrodes 03 is arranged on the array substrate 02, is disposed on the same layer and independent of each other, and is insulated from the data lines 01.

The touch detection chip 04 is provided and configured to determine a touch position by detecting the capacitance value variation of the self-capacitance electrodes 03 during a touch period. For example, the touch detection chip 04 is amounted on the array substrate 02 or connected to the array substrate 02 though a flexible printed circuit (FPC).

The plurality of wires 05 are configured to connect corresponding self-capacitance electrodes 03 to the touch detection chip 04, is arranged on the same layer with the plurality of data lines 01 and insulated from the plurality of data lines 01, and have a same wiring direction as the plurality of data lines 01 for example.

In the in-cell touch panel provided by at least one embodiment of the present disclosure, the wires connected with the self-capacitance electrodes are formed by a pattern of the layer provided with the data lines 01. Therefore, compared with the process for manufacturing the in-cell touch panel by adding two film layers on the basis of the process for manufacturing the array substrate 02, the embodiment of the present disclosure can achieve the touch function by only adding one process of forming the self-capacitance electrodes 03, and hence the production costs are reduced and the production efficiency is improved. In the embodiment of the present disclosure, the wires 05 connected with the self-capacitance electrodes 03 have a same wiring direction as the data lines 01, so that connected positions of the wires 05 and the touch detection chip 04 will not occupy frames on both sides, and hence the touch panel with narrow-frame design can be easily realized.

For instance, in order to not affect the aperture ratio of the touch panel, the wires 05 additionally arranged on the film layer provided with the data lines 01 are usually arranged within gaps of sub-pixels in the array substrate. For instance, the following two modes may be adopted:

First Mode

The array substrate 02 is usually provided with a plurality of sub-pixels. In the display panel comprising the array substrate, sub-pixel columns for displaying (correspondingly have color filters of different colors) are alternately arranged, these color filters of colors may be provided on an opposing substrate that is provided opposite to the array substate or on the array substate itself, and the embodiments of the disclosre is not limitted thereto. For example, the array substrate 02 is provided with a plurality of alternately arranged sub-pixel columns with color filters of different colors. An area occupied by sub-pixel columns with color filters of one color may be set to be smaller than areas occupied by sub-pixel columns with color filters of other colors, so that the wires can be conveniently arranged within gaps adjacent to the sub-pixel columns with the color filters of one color occupying the small area.

Taking the case that the array substrate 02 is provided with sub-pixels of three primary colors as an example, as illustrated in FIG. 1, the array substrate 02 may comprise red (R) sub-pixel columns, green (G) sub-pixel columns and blue (B) sub-pixel columns that are alternately arranged. As human eyes are not very sensitive to B sub-pixels, an area of the B sub-pixel columns can be appropriately narrowed, namely the area occupied by the B sub-pixel columns is set to be smaller than an area occupied by the R sub-pixel columns or the G sub-pixel columns. In this case, the wires 05 are arranged within the gaps adjacent to the B sub-pixel columns and do not occupy the areas of other kinds of sub-pixels.

In the arrangement of the wires 05 in the first mode, if the data lines 01 are also arranged within the gaps adjacent to the B sub-pixel columns, besdies the arrangement of the wires 05, signals transmitted over the wires 05 and that over the data lines 01 will have the problem of mutual interference.

Second Mode

Figure 2:
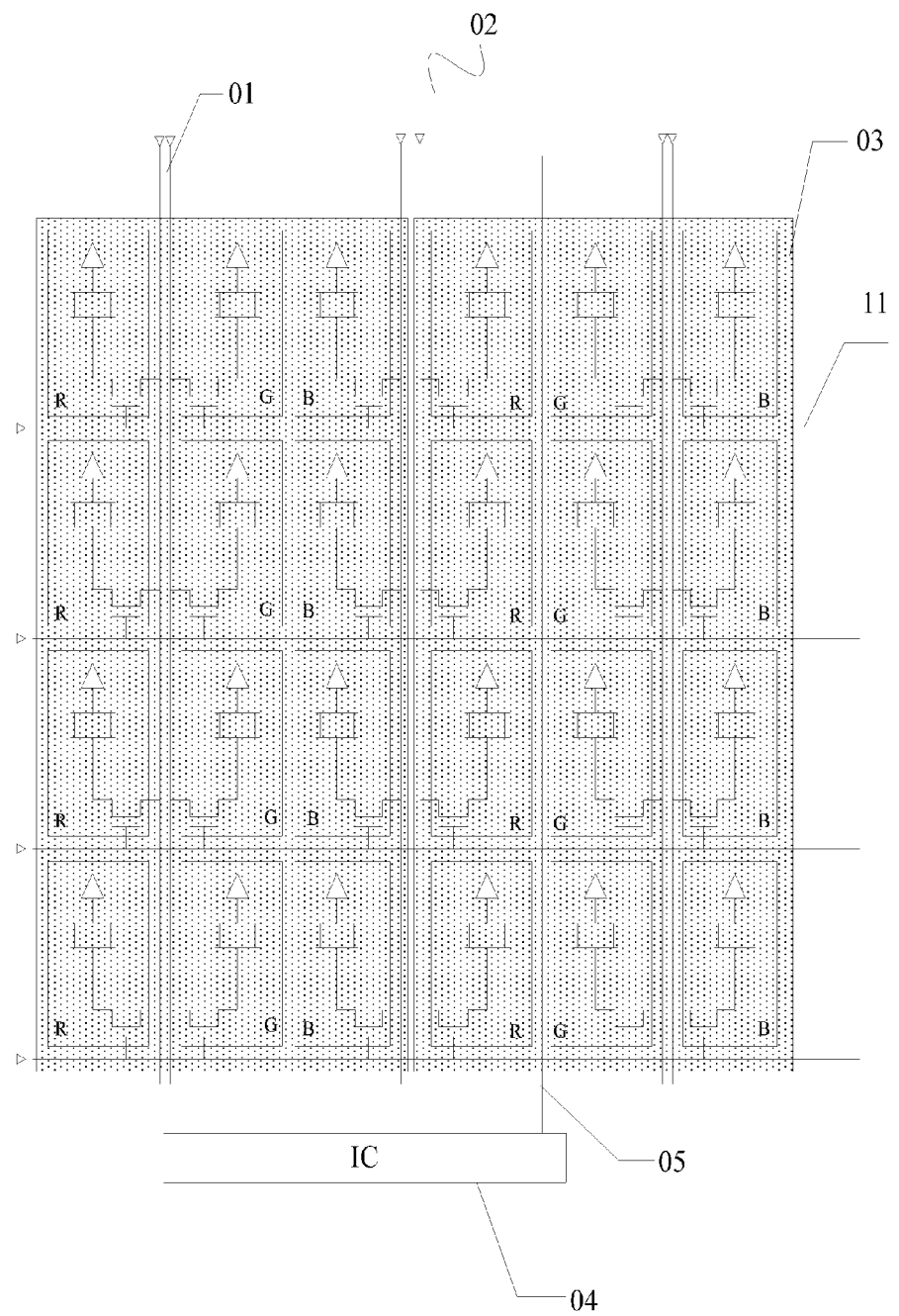

The array substrate 02 is provided with a plurality of sub-pixels arranged in an array; every two adjacent columns of sub-pixels are taken as a sub-pixel group; and two data lines 01 are arranged between the two columns of sub-pixels and configured to provide data signals to the two columns of sub-pixels respectively. The position originally for the data lines 01 between adjacent sub-pixel groups may be saved by changing the position of the data lines 01 between the two adjacent columns of sub-pixels compared with the layout in FIG. 1. In this case, as illustrated in FIG. 2, the wires 05 may be arranged within gaps between the adjacent sub-pixel groups.

In the arrangement the wires 05 of the second mode, no data lines 01 are arranged within the gaps between the sub-pixel groups, where the wires 05 are arranged, and hence the problem of mutual interference of signals transmitted by the wires 05 and the data lines 01 does not exist.

In term of interference, the second mode of arranging the wires 05 is better than the first mode of arranging the wires 05.

Figure 3:
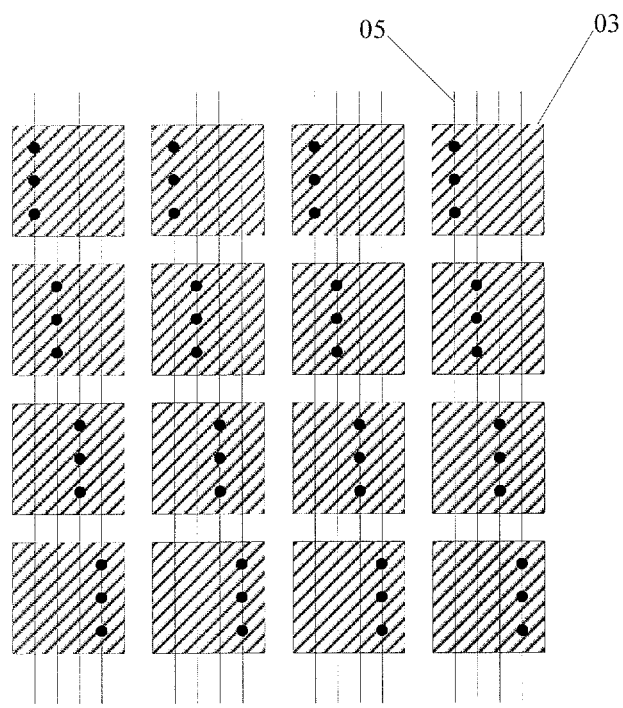
FIGS. 3 and 4 are respectively schematic diagrams illustrating the connection relationship between self-capacitance electrodes and wires in the in-cell touch panels provided by the embodiment of the present disclosure.

In the touch panel provided by the embodiment of the present disclosure, as illustrated in FIG. 3, the self-capacitance electrodes 03 and the wires 05 are usually arranged on different layers. In order to reduce the resistance of the self-capacitance electrodes 03 and improve the signal-to-noise ratio of electric signals transmitted by the self-capacitance electrodes, the self-capacitance electrodes 03 can be electrically connected with corresponding wires 05 via a plurality of through holes. By adoption of the structure, it is equivalent that the self-capacitance electrodes 03 are in parallel connection with the plurality of wires 05 of metallic resistance. Therefore, the resistance of the electrodes can be remarkably reduced and the signal-to-noise ratio of the electrodes in the process of signal transmission can be improved.

Figure 4:
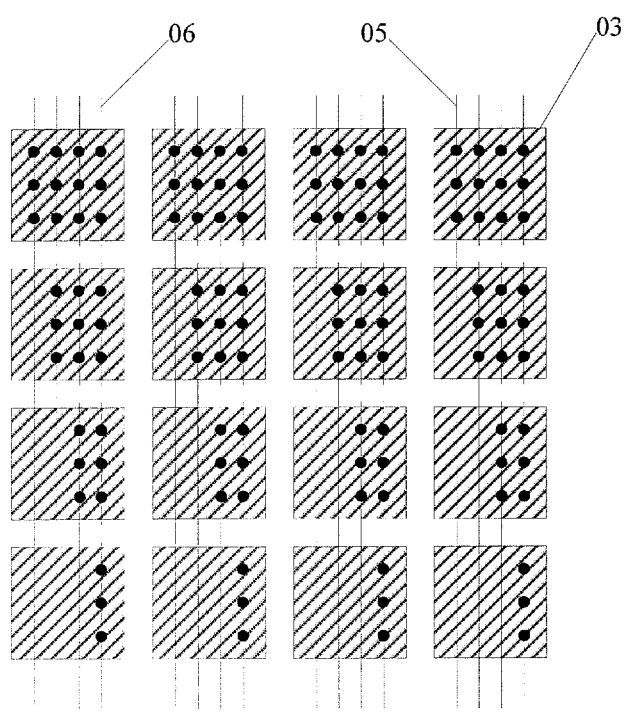

Moreover, in order to further reduce the resistance of the self-capacitance electrodes 03, in the process of designing the wires 05, as illustrated in FIG. 4, while the wires 05 are electrically connected with corresponding self-capacitance electrodes 03, the entire wire 05 for running through the entire panel originally may be cut (divided) to form the wires 05 and a plurality of connection wires 06 arranged on the same layer with the wires 05 and insulated from the wires 05. The connection wires 06 are for example formed of the same conductive mateiral (metal) as the wires 05. The connection wires 06 are arranged in the same straight lines with the wires 05 and are in parallel connection with an overlapped self-capacitance electrode 03; one connection wire 06 is electrically connected with the self-capacitance electrode 03 via a through hole (via hole). The above design can fully utilize the gaps between the adjacent sub-pixels, maintain the aperture ratio of the touch panel, and meanwhile utilize spare parts of the wires 05 to arrange the connection wires 06 of low resistance and allow the connection wires 06 of low resistance to be in parallel connection with the self-capacitance electrodes 03 with high resistance, remarkably reducing the resistance of the self-capacitance electrodes 03.

In practice, the inventors have found that: when the wires 05 are connected with corresponding self-capacitance electrodes 03 via the through holes, as illustrated in FIGS. 3 and 4, the through holes for connecting the self-capacitance electrodes 03 and corresponding wires 05 are not uniformly distributed across the entire display area, and hence the overall uniformity of image display of the touch panel can be affected disadvantageously.

Figure 5A:
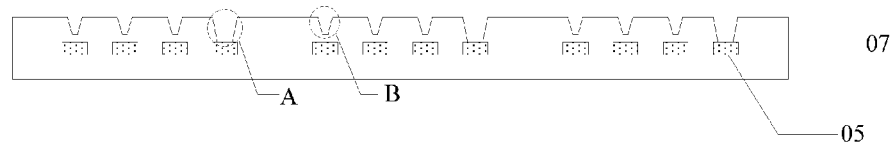
FIGS. 5*a* and 5*b* are respectively schematic structural views illustrating the arrangement of true and dummy through holes in the in-cell touch panels provided by the embodiment of the present disclosure.
Figure 5A:
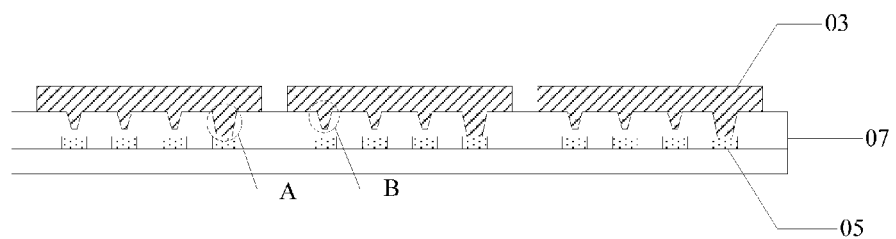

In the touch panel provided by at least one embodiment of the present disclosure, as illustrated in FIG. 5a, an interlayer insulating layer 07 is arranged between the self-capacitance electrodes 03 and the wires 05, so that the self-capacitance electrodes 03 are electrically connected with the wires 05 via through holes. A running through the interlayer insulating layer 07. An upper portion in FIG. 5a shows that the interlayer insulating layer 07 is disposed above the wires 05; a lower portion in FIG. 5a shows that the self-capacitance electrodes 03 is disposed above the interlayer insulating layer 07 (for example, the interlayer insulating layer 07 is arranged between the self-capacitance electrodes 03 and the wires 05). Moreover, dummy through holes are formed at overlapped areas, between the self-capacitance electrodes 03 and the wires 05 not connected therewith, in the interlayer insulating layer 07; for example, recessed portions B are formed at the overlapped areas, between the self-capacitance electrodes 03 and the wires 05 except the electrically connected wires 05, in the interlayer insulating layer 07. By provision of the dummy through holes matched with the true through holes A in the interlayer insulating layer, the graphic uniformity of the entire display area is maintained, and hence the uniformity of image display of the touch panel is improved.

It should be noted that: in the touch panel provided by at least one embodiment of the present disclosure, the interlayer insulating layer 07 arranged between the self-capacitance electrodes 03 and the wires 05 may be formed of a plurality of insulating layers and may also be formed of one insulating layer. No limitation will be given here. The through holes A formed in the interlayer insulating layer 07 refer to holes running through the insulating layers of the interlayer insulating layer 07. The recessed portions B formed in the interlayer insulating layer 07 refer to recesses not running through the interlayer insulating layer 07.

Figure 5B:
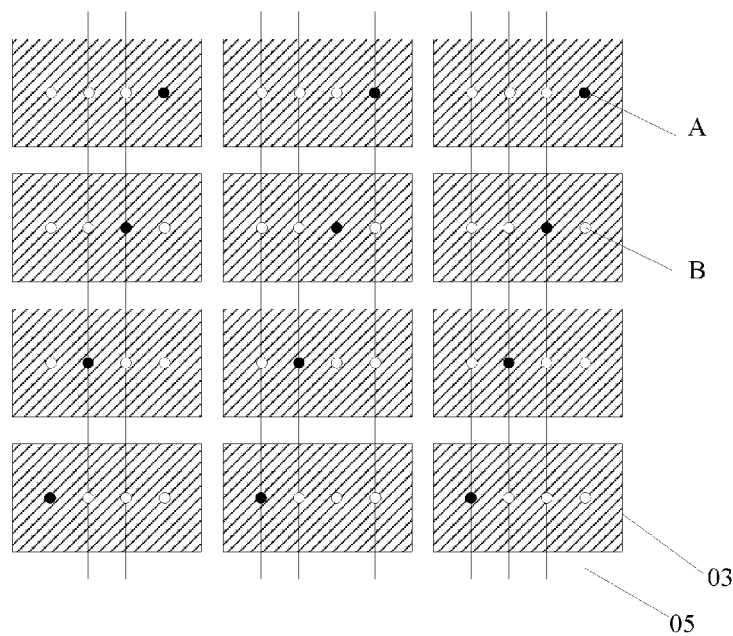

Moreover, in order to guarantee the graphic uniformity of the display area of the touch panel, when the through holes A and the recessed portions B in the interlayer insulating layer 07 are formed, the through holes A and the recessed portions B may be designed to have same cross-sectional shape, for instance, may be designed as a round shape (e.g., circle) with a same diameter. In addition, in general, as illustrated in FIG. 5b, the through holes A and the recessed portions are designed to be uniformly distributed in the interlayer insulating layer 07.

The touch panel provided by at least one embodiment of the present disclosure not only is applicable to a twisted nematic (TN) LCD but also is applicable to an advanced dimension switch (ADS) LCD or an in-plane switch (IPS) LCD.

When the touch panel provided by at least one embodiment of the present disclosure is applied to a traditional ADS LCD panel, a common electrode layer, for example in the form of a plate electrode, is disposed on a lower layer (more close to a base substrate) and pixel electrodes, for example in the form of slit-containing electrodes, are disposed on an upper layer (more close to a liquid crystal layer), namely the common electrode layer is disposed between the pixel electrodes and the array substrate (base substrate). Moreover, an insulating layer is generally disposed between the pixel electrodes and the common electrode layer. When the touch panel provided by at least one embodiment of the present disclosure is applied to an HADS LCD panel, pixel electrodes, for example in the form of plate electrodes, are disposed on a lower layer (more close to a base substrate) and a common electrode layer, for example in the form of a slit-containing electrode, is disposed on an upper layer (more close to a liquid crystal layer), namely the pixel electrodes are disposed between the common electrode layer and the array substrate (base substrate). Moreover, an insulating layer is generally disposed between the pixel electrodes and the common electrode layer.

Figure 6A:
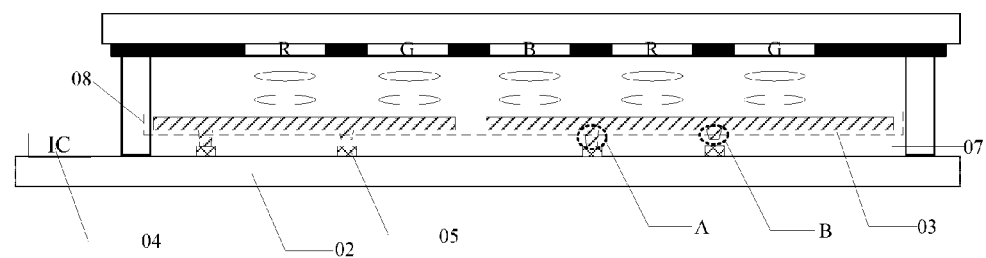
FIGS. 6*a* and 6*b* are respectively schematic structural side views of the in-cell touch panels provided by the embodiment of the present disclosure.

When the touch panel provided by at least one embodiment of the present disclosure is applied to an ADS LCD, as illustrated in FIG. 6a, the common electrode layer 08 on the array substrate 02 may be also taken as the self-capacitance electrodes 03, namely the self-capacitance electrodes 03 are combined into the common electrode layer 08 on the array substrate 02. Moreover, for example, the touch detection chip 04 is also configured to apply common electrode signals to the self-capacitance electrodes 03 during a display period. When the structure of the common electrode layer 08 is changed and the common electrode layer 08 is divided into the self-capacitance electrodes 03 to achieve the touch function, no additional process is required on the basis of the process for manufacturing the traditional array substrate, and hence the production costs can be reduced and the production efficiency can be improved.

Figure 6B:
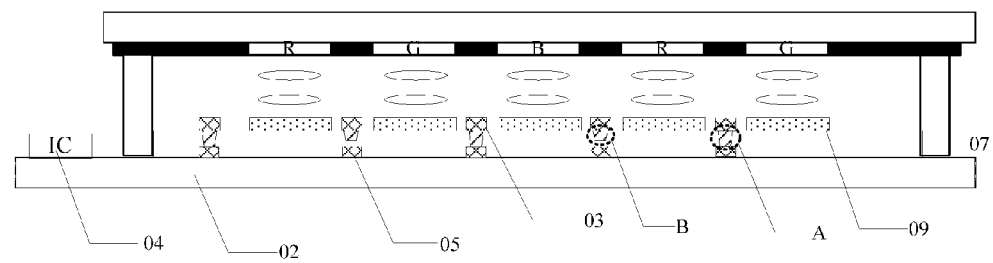

In the touch panel provided by at least one embodiment of the present disclosure, as illustrated in FIG. 6b, the self-capacitance electrodes 03 are arranged on the same layer with pixel electrodes 09 and further may also be arranged within gaps between the pixel electrodes 09, namely the self-capacitance electrodes 03 and the pixel electrodes 09 on the array substrate 02 are arranged on the same layer. In addition, the pattern of the self-capacitance electrode 03 is disposed at a gap between two adjacent pixel electrodes 09. When the structure of a pixel electrode layer is changed and the self-capacitance electrodes 03 are formed at the original gaps between the pixel electrodes 09, no additional process is required on the basis of the process for manufacturing the traditional array substrate, and hence the production costs can be reduced and the production efficiency can be improved.

According to the mode of the LCD panel specifically applied by the touch panel, when the common electrode layer 08 is also taken as the self-capacitance electrodes 03, slit-containing indium tin oxide (ITO) electrode structures or plate ITO electrode structures may be disposed at positions of the self-capacitance electrodes 03, corresponding to opening areas of sub-pixels. That is to say, in the HADS mode, the self-capacitance electrodes 03 are formed of slit-containing ITO electrodes. For instance, the slit-containing ITO electrode structure refers to the arrangement of a slit-containing ITO electrode at an opening area of a sub-pixel.

In the ADS mode, the self-capacitance electrodes 03 are formed of plate ITO electrodes so as to satisfy the LCD requirement. At this point, the self-capacitance electrodes 03 may react with an electric field of the human body through slit areas of the pixel electrode layer 09. As the general structures of the LCD panels in the ADS mode and the HADS mode can be traditionally realized, no further description will be given here.

In general, the resolution of a touch panel is usually at an order of millimeter. Therefore, in practice, the distribution density and the occupied area of the self-capacitance electrodes 03 may be selected according to the required touch resolution, so as to ensure the required touch resolution. The self-capacitance electrodes 03 are usually designed into be square electrodes with the size of about 5 mm*5 mm. The resolution of a display is usually at an order of micrometer.

Therefore, one self-capacitance electrode 03 may generally correspond to one or more sub-pixels in the display.

In the in-cell touch panel provided by at least one embodiment of the present disclosure, when the entire layer of the common electrode layer 08 that is provided on the array substrate 02 is divided into the plurality of self-capacitance electrodes 03, in order to not affect the normal display function, in dividing the common electrode layer 08, dividing lines will usually bypass the display opening areas of the sub-pixels and arranged in the pattern areas of a black matrix layer, namely orthographic projections of gaps between the self-capacitance electrodes, on the array substrate 02, will usually be within the gaps of sub-pixels of the array substrate 02.

In another example, in the in-cell touch panel provided by at least one embodiment of the present disclosure, patterns of the self-capacitance electrodes 03 are disposed in the gaps between the pixel electrodes 09, in which case the patterns of the self-capacitance electrodes 03 usually form a network configuration with the pixel electrodes 09 being in the cells.

In the touch panel provided by at least one embodiment of the present disclosure, no matter the common electrode layer 08 is also used as the self-capacitance electrodes 03 or the self-capacitance electrodes 03 are arranged in the gaps between the pixel electrodes 09, in order to reduce mutual interference between display signals and touch signals, the drive mode of time-sharing between a touch period and a display period may be adopted. Moreover, in an example, a display drive chip and the touch detection chip may further be integrated into one chip, and hence the production costs can be further reduced.

Figure 7A:
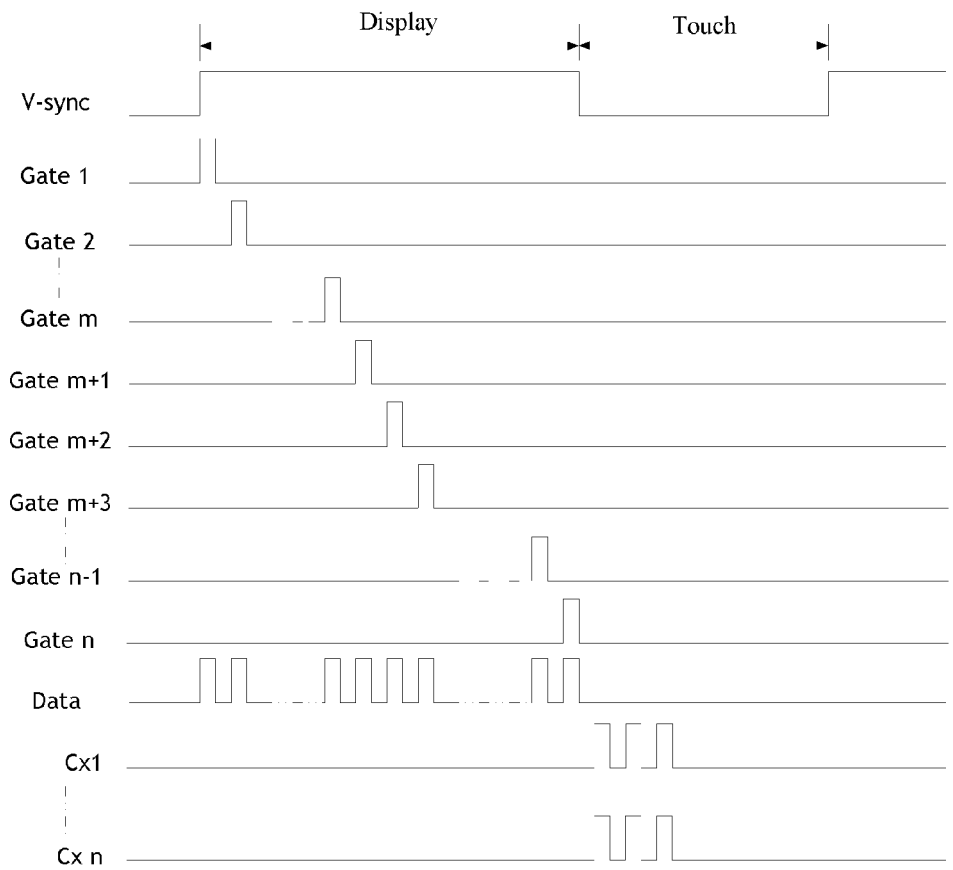
FIGS. 7*a* and 7*b* are respectively schematic diagrams illustrating the drive timing sequence of the in-cell touch panels provided by the embodiment of the present disclosure.
Figure 7B:
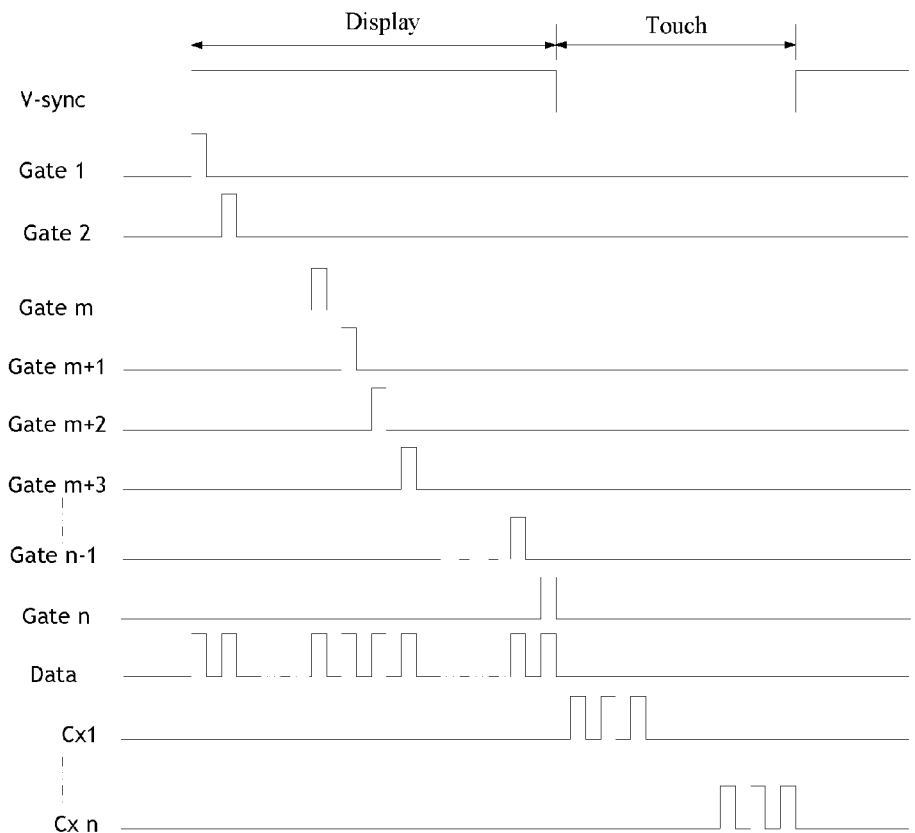

For instance, in the drive timing sequence patterns as shown in FIGS. 7a and 7b, the time period for the touch panel to display each frame (V-sync) is divided into a display period (Display) and a touch period (Touch). For instance, in the drive timing sequence patterns as shown in FIGS. 7a and 7b, the time period for the touch panel to display one frame is 16.7 ms, of which 5 ms are selected for the touch period and the rest 11.7 ms are taken as the display period. Of course, the duration of the touch period and the display period may also be appropriately adjusted according to the processing capacity of an IC chip, and no specific limitation is imposed here. In the display period (Display), the gate signal lines Gate 1, Gate 2 . . . Gate n in the touch panel each are applied with a gate scanning signal in order; data signal lines Data are applied with gray-scale signals respectively; and the touch detection chip connected with self-capacitance electrodes Cx1 . . . Cxn respectively applies a common electrode signal to the self-capacitance electrodes Cx1 . . . Cxn, so as to achieve the LCD function. In the touch period (Touch), as illustrated in FIG. 7a, the touch detection chip connected with the self-capacitance electrodes Cx1 . . . Cxn applies driving signals to the self-capacitance electrodes Cx1 . . . Cxn at the same time and receives feedback signals of the self-capacitance electrodes Cx1 . . . Cxn at the same time; in antheor example, as illustrated in FIG. 7b, the touch detection chip connected with the self-capacitance electrodes Cx1 . . . Cxn applies driving signals to the self-capacitance electrodes Cx1 . . . Cxn in order and receives feedback signals of the self-capacitance electrodes Cx1 . . . Cxn respectively. No limitation will be imposed here. Whether a touch ocurrs is determined through analyzation of the feedback signals, and hence the touch function can be achieved.

In the in-cell touch panel provided by at least one embodiment of the present disclosure, as the capacitance of the human body is acted on the self-capacitance of the self-capacitance electrodes 03 by means of direct coupling, when the human body touches the screen of the panel, the capacitance value of the self-capacitance electrode 03 only at the touch position suffers from large variation, while the capacitance value of the self-capacitance electrodes 03 adjacent to the self-capacitance electrode 03 at the touch position has very small variation. Therefore, in the process of sliding on the touch panel, the touch coordinate of the area provided with the self-capacitance electrode 03 may not be determined. Therefore, opposite sides of the two adjacent self-capacitance electrodes 03 may be all formed in fold lines, so as to increase the capacitance value variation of the self-capacitance electrodes 03 adjacent to the self-capacitance electrode 03 at the touch position.

Figure 8A:
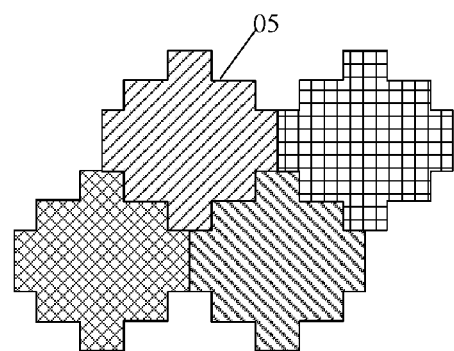
FIGS. 8*a* and 8*b* are respectively schematic structural views illustrating the examples in which opposite sides of adjacent self-capacitance electrodes are set to be fold lines in the in-cell touch panels provided by the embodiment of the present disclosure.

For example, the overall shape of the self-capacitance electrodes 03 may be set in one of the following two means or the combined means of both:

1. Opposite sides, in fold lines, of the two adjacent self-capacitance electrodes 03 may be all formed to be stepped structures. The two stepped structures have consistent shapes and match with each other, as illustrated in FIG. 8a which illustrates 2*2 self-capacitance electrodes 03.

Figure 8B:
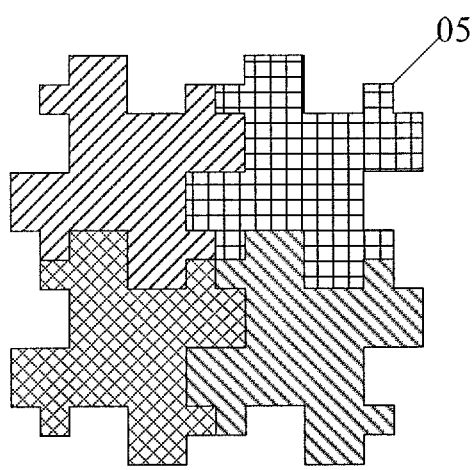

2. Opposite sides, in fold lines, of the two adjacent self-capacitance electrodes 03 may be all formed to be concave-convex structures. The two concave-convex structures have consistent shapes and match with each other, as illustrated in FIG. 8b which illustrates 2*2 self-capacitance electrodes 03.

In the touch panel provided by at least one embodiment of the present disclosure, film layers on the array substrates 02 may be prepared by known processes. For instance, eight (8) patterning processes may be adopted: patterning for gate electrodes of TFTs and gate lines, patterning for an active layer of TFTs, patterning for a first insulating layer, patterning for data lines and source/drain electrodes of TFTs, patterning for a resin layer, patterning for pixel electrodes, patterning for a second insulating layer, and patterning for a common electrode layer. In other examples, seven (7) patterning processes, six (6) patterning processes or five (5) patterning processes may also be adopted according to designs, and the embodiemnts of the present disclosure are not limitted thereto.

At least one embodiment of the present disclosure further provides a display device, which comprises the in-cell touch panel provided by any embodiment of the present disclosure. The display device may be any product or component with display function, e.g., mobile phone, tablet computer, television, monitor, notebook computer, digital picture frame, navigator or watch. The embodiments of the display device may refer to the embodiments of the in-cell touch panel.

In the in-cell touch panel and the display device provided by at least one embodiment of the present disclosure, the plurality of self-capacitance electrodes disposed on the same layer and independent of each other are arranged on the array substrate in the self-capacitance principle; the touch detection chip can determine the touch position by detecting the capacitance value variation of the self-capacitance electrodes in the touch period. For example, the wires which are insulated from the data lines and extend in a same wiring direction as the data lines are arranged on the same layer with the data lines and configured to connect the self-capacitance electrodes to the touch detection chip. For example, the pattern of the layer provided with the data lines form the wires connected with the self-capacitance electrodes in the touch panel provided by the embodiment of the present disclosure, thus compared with the process for manufacturing the in-cell touch panel by adding two film layers on the basis of the process for manufacturing the tranditional array substrate, the touch function can be achieved by only adding one process of forming the self-capacitance electrodes, and hence the production costs can be reduced and the production efficiency can be improved. Moreover, as the wires connected with the self-capacitance electrodes have a same wiring direction as the data lines, the connections between the wires and the touch detection chip will not occupy the frames on both sides, and hence the touch panel with narrow-frame design can be easily obtained.

The foregoing is only the preferred embodiments of the present disclosure and not intended to limit the scope of protection of the present disclosure. The scope of protection of the present disclosure should be defined by the appended claims.

The application claims priority to the Chinese patent application No. 201410357093.3 submitted on Jul. 24, 2014, and the disclosure of the Chinese patent application is entirly incorporated herein by reference as part of present the application.

The invention claimed is:

1. An in-cell touch panel, comprising:
    an array substrate, comprising data lines provided thereon;
    a plurality of self-capacitance electrodes, which are provided on a same layer and independent of each other on the array substrate, wherein the self-capacitance electrodes are insulated from the data lines;
    a touch detection chip; and
    a plurality of wires for connecting the self-capacitance electrodes to the touch detection chip, wherein the wires and the data lines are arranged on the same layer and insulated from each other and have a same direction, wherein:
    an interlayer insulating layer is provided between the self-capacitance electrodes and the wires, and through holes and recessed portions are provided in the interlayer insulating layer,
    the self-capacitance electrodes are electrically connected with corresponding wires by the through holes of the interlayer insulating layer, and the recessed portions are formed in overlapped areas, between the self-capacitance electrodes and wires except the wires electrically connected therewith, in the interlayer insulating layer.

2. The in-cell touch panel according to claim 1, wherein the array substrate is provided with a plurality of alternately arranged sub-pixel columns with color filters of different colors, an area occupied by sub-pixel columns of color filters of one color is smaller than areas occupied by sub-pixel columns of color filters of other colors, and
    the wires are arranged within gaps adjacent to the sub-pixel columns of color filters of one color occupying the small area.

3. The in-cell touch panel according to claim 2, wherein the array substrate is provided with alternately arranged red sub-pixel columns, green sub-pixel columns and blue sub-pixel columns, an area occupied by the blue sub-pixel columns is smaller than an area occupied by the red sub-pixel columns or the green sub-pixel columns, and
    the wires are arranged within gaps adjacent to the blue sub-pixel columns.

4. The in-cell touch panel according to claim 2, wherein the self-capacitance electrodes together form a common electrode layer on the array substrate, and the touch detection chip is also configured to apply a common electrode signals to the self-capacitance electrodes in a display period.

5. The in-cell touch panel according to claim 2, wherein the array substrate comprises pixel electrodes,
the self-capacitance electrodes and the pixel electrodes on the array substrate are disposed on the same layer; and
the self-capacitance electrodes are each provided in a gap between two adjacent pixel electrodes.

6. The in-cell touch panel according to claim 1, wherein the through holes and the recessed portions have a same cross-sectional shape and are uniformly distributed in the interlayer insulating layer.

7. The in-cell touch panel according to claim 1, wherein the self-capacitance electrodes together form a common electrode layer on the array substrate, and
the touch detection chip is also configured to apply a common electrode signals to the self-capacitance electrodes in a display period.

8. The in-cell touch panel according to claim 1, wherein the self-capacitance electrodes together form a common electrode layer on the array substrate, and
the touch detection chip is also configured to apply a common electrode signals to the self-capacitance electrodes in a display period.

9. The in-cell touch panel according to claim 1, wherein the array substrate comprises pixel electrodes, the self-capacitance electrodes and the pixel electrodes on the array substrate are disposed on the same layer, and the self-capacitance electrodes are each provided in a gap between two adjacent pixel electrodes.

10. The in-cell touch panel according to claim 1, wherein the array substrate comprises pixel electrodes, the self-capacitance electrodes and the pixel electrodes on the array substrate are disposed on the same layer, and the self-capacitance electrodes are each provided in a gap between two adjacent pixel electrodes.

11. The in-cell touch panel according to claim 1, wherein two adjacent self-capacitance electrodes have opposite sides formed in fold lines.

12. The in-cell touch panel according to claim 11, wherein the opposite sides formed in fold lines of the two adjacent self-capacitance electrodes have consistent shapes and match with each other.

13. A display device, comprising the in-cell touch panel according to claim 1.

* * * * *